(12) United States Patent
Park

(10) Patent No.: US 6,425,209 B1
(45) Date of Patent: Jul. 30, 2002

(54) WEATHER STRIP FOR SUPPORTING DOOR GLASS OF AUTOMOBILE

(75) Inventor: Hyeon-Jung Park, Ulsan (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 09/657,873

(22) Filed: Sep. 8, 2000

(30) Foreign Application Priority Data

Dec. 28, 1999 (KR) .................................................. 63351

(51) Int. Cl.$^7$ ................................................ B60J 5/04
(52) U.S. Cl. ...................................................... 49/502
(58) Field of Search ........................... 49/475.1, 483.1, 49/502

(56) References Cited

U.S. PATENT DOCUMENTS

| | | | |
|---|---|---|---|
| 4,348,046 A | * 9/1982 | Ohya | 49/502 X |
| 4,653,230 A | * 3/1987 | Seo et al. | 49/502 |
| 4,800,681 A | * 1/1989 | Skillen et al. | 49/502 X |
| 4,988,142 A | * 1/1991 | Chandler et al. | 49/502 X |
| 5,317,835 A | * 6/1994 | Dupuy et al. | 49/502 X |

FOREIGN PATENT DOCUMENTS

GB 2254354 * 10/1992 .................. 49/483.1

* cited by examiner

Primary Examiner—Jerry Redman
(74) Attorney, Agent, or Firm—Christie, Parker & Hale, LLP

(57) ABSTRACT

A weather strip for supporting a door glass of an automobile adapted to allow a first and a second weather strip for respectively supporting a moving glass and a fixed glass on a division channel to be coupled face to face and to allow the strips to be secured to a lower tip end of door chassis, thereby eliminating use of a separate part and stepped portion thereamong or maintaining a good exterior appearance, the automobile having a door mounted with the first weather strip and the second weather strip for respectively supporting the moving glass and the fixing glass to a division channel, wherein each upper tip end of the first weather strip and the second weather strip is formed with a correspondingly facing stepped surface, stepped surfaces being correspondingly contacted therebetween and the second weather strip is integrally formed therebehind with a protruder having a upwardly open recess, where the recess of the protruder is inserted by a lower coupling part of an external door panel to allow the first weather strip and the second weather strip to be respectively secured to the division channel.

8 Claims, 4 Drawing Sheets

WEATHER STRIP FOR SUPPORTING DOOR GLASS OF AUTOMOBILE

BACKGROUND OF THE INVENTION

1. Field of the Invention

The present invention relates to a fixed glass mounted at a rear door of an automobile, and more particularly to a weather strip for supporting a door glass of an automobile and adapted to be fixed to a division channel and a weather strip for fixing a fixed glass to a rear door without any assistance from a separate member to thereby improve exterior appearance and to reduce manufacturing costs.

2. Description of the Prior Art

Generally, an automobile is mounted at both sides thereof with a plurality of doors, each rotably hinged to a body for passengers to get on and get off therethrough and selectively locked via a lock device.

A rear door 11 mounted at a rear side of the body 10 is installed at the rear of a front door 12 arranged toward the front side of the body 10, as illustrated in FIG. 1, where the rear door 11 includes a moving glass 13 ascended and descended from inside the door by manipulation of a passenger to contact a door chassis and a fixed glass disposed at the rear of the moving glass 13 and fixed to the door chassis as illustrated in FIG. 2.

The rear door 11 is vertically arranged with a division channel 15 for dividing the moving glass 13 and the fixed glass 14 while the moving glass 13 and the fixed glass 14 are watertightly mounted on the door chassis via a first weather strip 16 and a second weather strip 17. The division channel 15 is attached thereon with a separate bracket 18 for fixing tip ends of the first weather strip 16 and the second weather strip 17 on the division channel 15, where the bracket 18 is integrally formed with a downwardly-bent hitching piece 19 so as to be hitched at a rear surface thereof by a rear surface of the division channel 15 as illustrated in FIGS. 3 and 4. The hitching piece 19 serves to fix the bracket 18 on the division channel 15, by which the bracket 18 respectively secures each tip end of the first weather strip 16 and the second weather strip 17 to the division channel 15.

However, there is a problem in the bracket 18 for respectively securing the first weather strip 16 for supporting the moving glass 13 and the second weather strip 17 for supporting the fixed glass 14 to the division channel 15 thus described in that the bracket 18 is secured to the division channel 15 via the hitching piece 19 integrally formed therebehind, such that detachability and attachability are not good and the bracket 18 cannot be reused once the hitching piece 19 is broken.

There is another problem in the bracket 18 for securing the tip ends of the first weather strip 16 and the second weather strip 17 on the division channel 15 in that the bracket 18 is outwardly protruded from the first weather strip 16 and the second weather strip 17 to give a bad exterior look and to provide a cause of generating a noise from stepped area when an automobile is running.

There is still another problem in the thus-described structure where the first weather strip 16 and the second weather strip 17 are secured to the division channel 15 in that use of the bracket 18 is inevitable to increase manufacturing cost.

SUMMARY OF THE INVENTION

The present invention is disclosed to solve the aforementioned problems and it is an object of the present invention to provide a weather strip for supporting a door glass of an automobile adapted to allow a first and a second weather strip for respectively supporting a moving glass and a fixed glass on a division channel to be coupled face to face and to allow the strips to be secured to a lower tip end of door chassis, thereby eliminating use of a separate part and stepped portion thereamong or maintaining a good exterior appearance.

In accordance with the object of the present invention, there is provided a weather strip for supporting a door glass of an automobile having a door mounted with a first weather strip and a second weather strip for respectively supporting a moving glass and a fixing glass to a division channel, wherein each upper tip end of the first weather strip and the second weather strip is formed with a correspondingly facing stepped surface, the stepped surfaces being correspondingly contacted therebetween and the second weather strip is integrally formed therebehind with a protruder having a upwardly opened recess, where the recess of the protruder is inserted by a lower coupling part of an external door panel to allow the first weather strip and the second weather strip to be respectively secured to the division channel.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiments according to the present invention will be described in detail with reference to the accompanying drawings.

Figure 1:
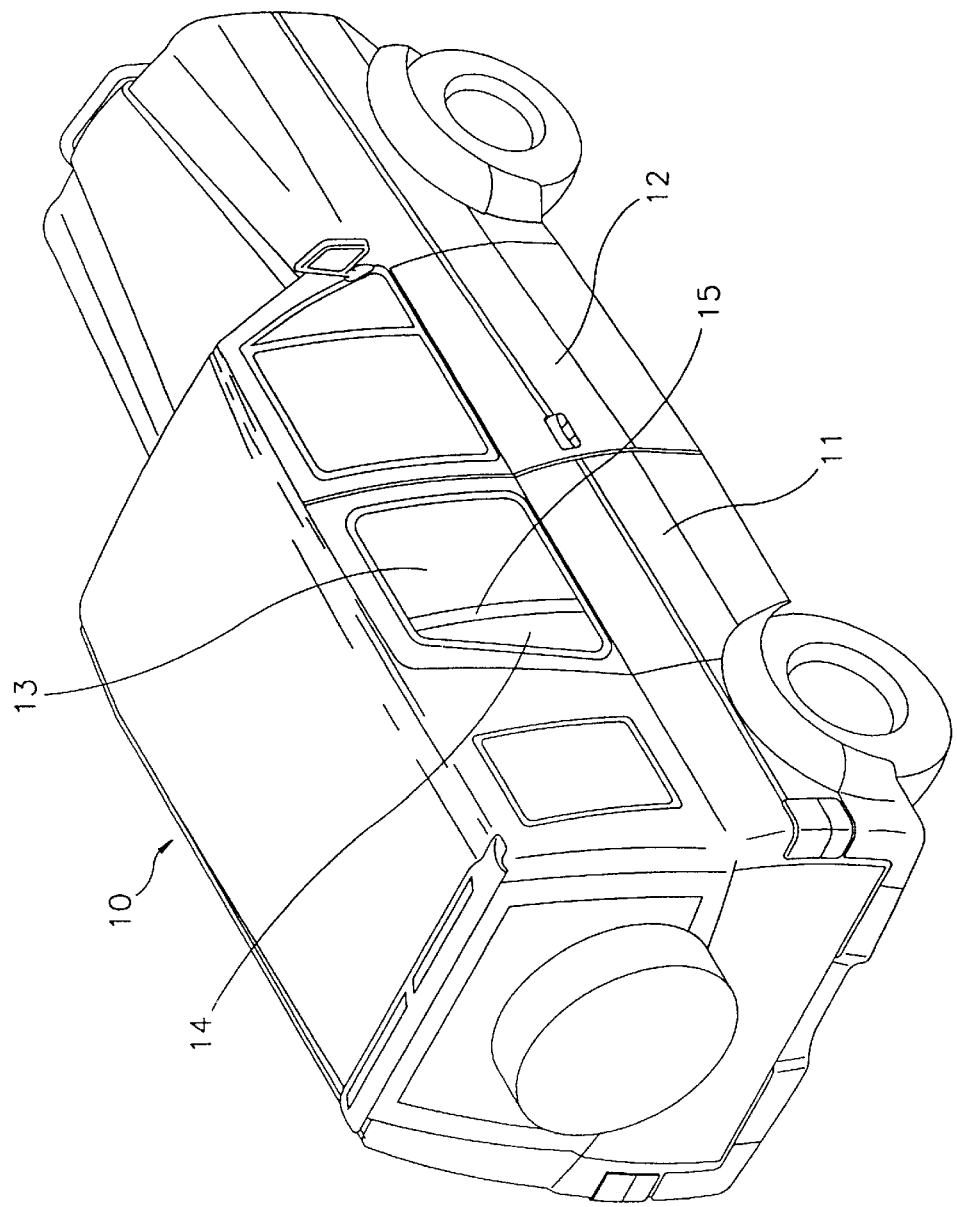
FIG. 1 is a perspective view for illustrating an exterior appearance of a general automobile.
Figure 2:
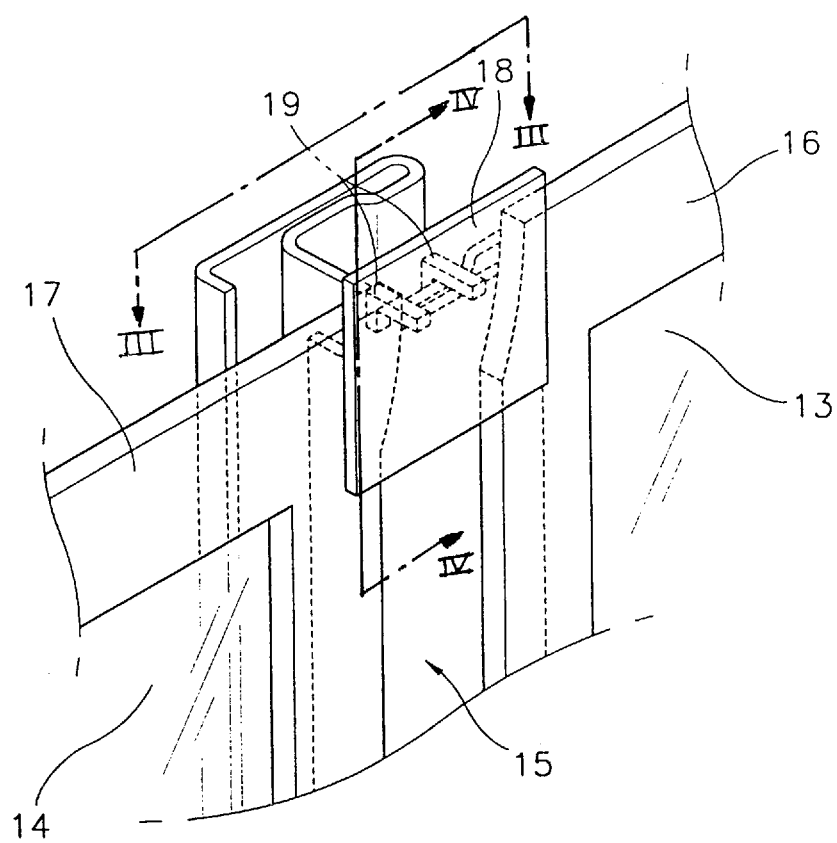
FIG. 2 is a perspective vie for partially illustrating a fixed state of weather strip for supporting a fixed glass at a rear door of a conventional automobile secured to a division channel via a fixing bracket.
Figure 3:
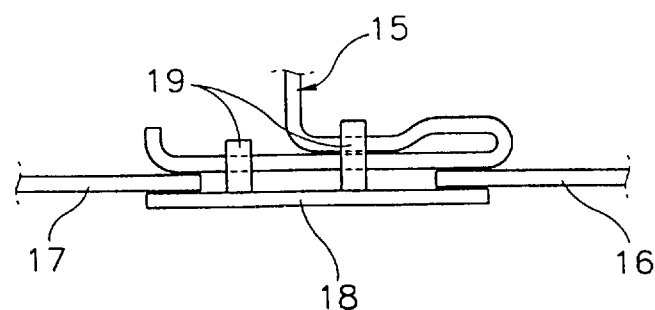
FIG. 3 is a plan view of FIG. 2 taken along arrows III—III.
Figure 4:
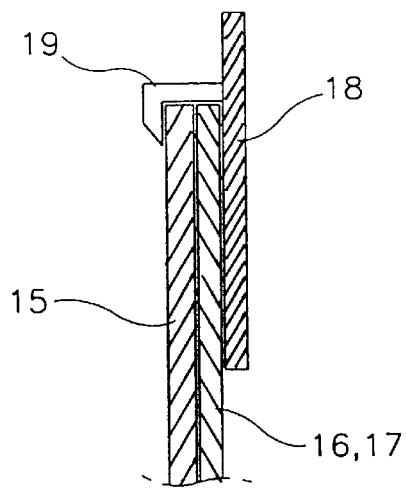
FIG. 4 is a longitudinal sectional view of FIG. 2 taken along arrows IV—IV.
Figure 5:
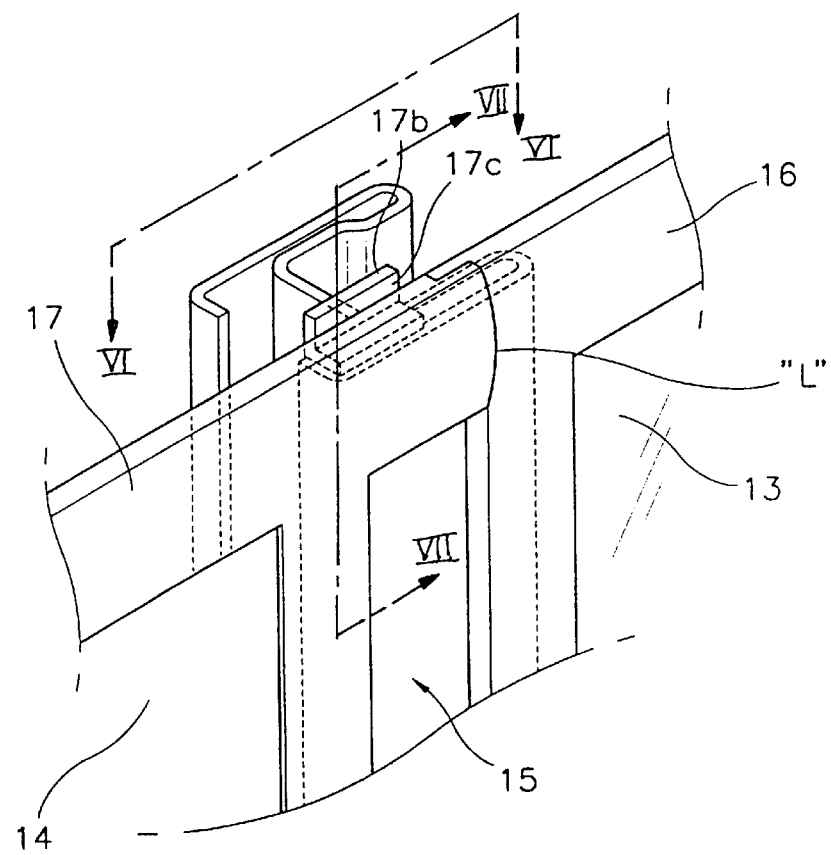
FIG. 5 is a perspective view for partially illustrating a weather strip mounted at a division channel for supporting a fixed glass of a rear door according to the present invention.
Figure 6:
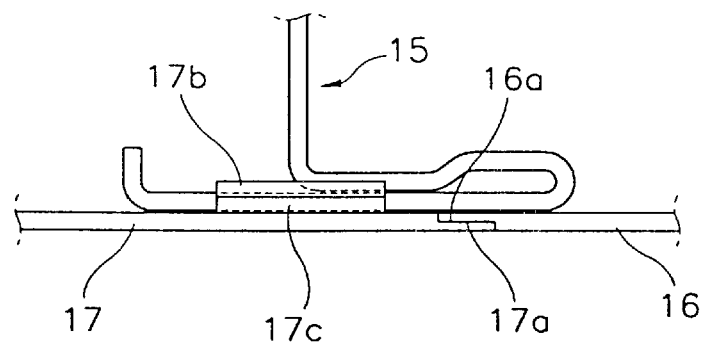
FIG. 6 is a plan view of FIG. 5 taken along arrows VI-VI.
Figure 7:
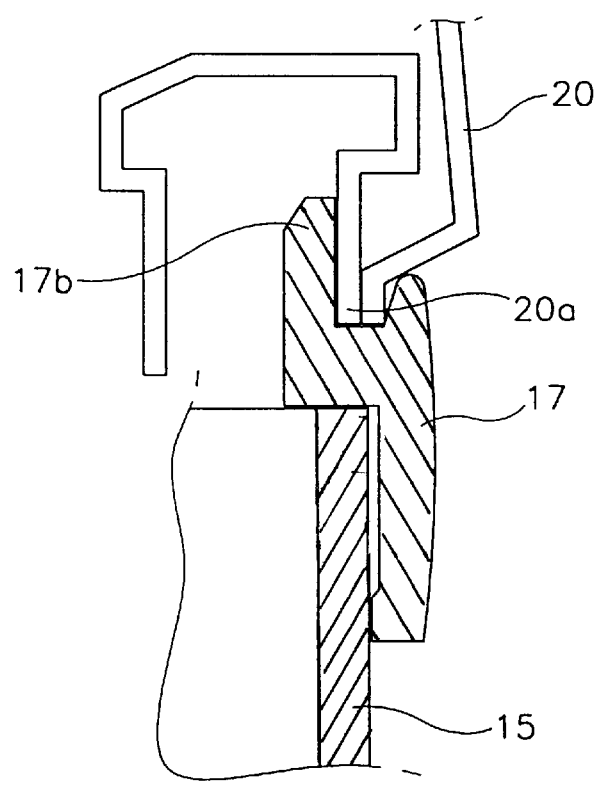
FIG. 7 is a longitudinal sectional view of FIG. 5 taken along arrows VII—VII.

FIG. 5 is a perspective view for partially illustrating a weather strip mounted at a division channel for supporting a fixed glass of a rear door according to the present invention while FIG. 6 is a plan of FIG. 5 and FIG. 7 is a longitudinal sectional view of FIG. 5. Throughout the drawings, like reference numerals and symbols are used for designation of like or equivalent parts or portions as in FIGS. 2, 3 and 4 for illustrating a weather strip on a division channel according to the prior art.

As illustrated in the drawings, the first weather strip 16 for watertightly supporting the moving glass 13 at the rear door 11 is integrally formed at an upper tip end thereof with a stepped surface 16a partially cut lengthwise and the second weather strip 17 for watertightly supporting the fixed glass 14 of the rear door 11 is also integrally formed at an upper tip end thereof corresponding to the stepped surface 16a of the first weather strip 16 with a stepped surface 17a partially cut lengthwise, such that both stepped surfaces 16a and 17a mutually join to form a straight even form at a joint area thereof. The joint between the first and the second weather strip 16 and 17 is ostensibly seen to have no stepped portion, only revealing a linear coupling portion (L) to the outside.

Furthermore, the second weather strip 17 is integrally formed at an upper rear surface thereof with a protruder 17b having a recess 17c which protrudes to the rear and has an upwardly opening. The protruder 17b is supportively coupled thereunder to an upper portion of the division channel 15 whereas the upper recess 17c of the protruder 17b allows a lower joint 20a of an external door panel 20 formed on a door chassis of the rear door 11 to be inserted thereinto.

The first weather strip 16 supporting the moving glass 13 and the second weather strip 17 supporting the fixed glass 14 can be vertically secured on division channel 15 without any special swaying as the lower joint 20a of the external door panel 20 is supportively inserted into the recess 17c of the protruder 17b formed at the rear surface of the second weather strip 17, being coupled via each stepped surface 16a and 17a.

Meanwhile, when the first and second weather strip 16 and 17 watertightly securing the moving glass 13 and the fixed glass 13 and 14 at the rear door 11 of an automobile can be fixed to the division channel 15 without any particular extra member, manufacturing cost can be reduced. Also, a repeated detachment and attachment can be accomplished if only repeated coupling relative to the stepped surfaces 16a and 17a of the first and second weather strip 16 and 17 are possible.

Furthermore, the fist weather strip 16 for supporting the moving glass 13 and the second weather strip 17 for supporting the fixed glass 14 are coupled at even equal level to thereby improve an external appearance and to rule out generation of noise when an automobile is traveling.

As apparent from the foregoing, there is an advantage in the weather strip for supporting the door glass of automobile thus described according to the present invention in that the first weather strip 16 and the second weather strip 17 for supporting the moving glass 13 and the fixed glass 14 at the rear door of the automobile can be secured at the division channel 15 without any assistance of separate member to reduce the manufacturing cost, There is another advantage in that no stepped portion exists relative to a joint between the first weather strip 16 and the second weather strip 17 to expect an improved exterior appearance.

What is claimed is:

1. An automobile door glass assembly comprising:
   a first door glass;
   a second door glass;
   a door panel;
   a first weather strip mounted on the first door glass along a first portion of the first weather strip, the first weather strip having a tip end surface; and
   a second weather strip mounted on the second door glass along a first portion of the second weather strip, the second weather strip having a tip end surface mated to the tip end surface of the first weather strip, wherein one of the weather strips is secured to the door panel along a second portion of said one weather strip different from the first portion of said one weather strip.

2. The assembly as defined in claim 1, wherein respective tip end surfaces of the first and the second weather strips are complementary defining substantially identical stepped surfaces, wherein the stepped surface of the first weather strip is mated to and in contact with the complementary stepped surface of the second weather strip.

3. The assembly as defined in claim 1, wherein one of the weather strips is integrally formed with a protruder defining a recess for receiving a tip end of the door panel.

4. The assembly as defined in claim 3, wherein the first door glass is a moving glass, wherein the second door glass is a fixed glass, wherein a division channel is formed between the moving glass and the fixed glass to allow the protruder to be supportively coupled to the division channel.

5. An automobile door glass assembly comprising:
   a first door glass;
   a second door glass;
   a door panel;
   a first weather strip on the first door glass, the first weather strip having a tip end surface; and
   a second weather strip on the second door glass and having a tip end surface coupled to the tip end surface of the first weather strip, wherein one of the weather strips comprises a protruding portion defining a recess, wherein a portion of the door panel is received by said recess securing the door panel to said strip having the recess.

6. The assembly as defined in claim 5 further comprising a division member separating the first glass from the second glass.

7. The assembly as defined in claim 6 wherein the first strip has a stepped tip portion and wherein the second strip has a stepped tip portion complementary to the stepped tip of the first strip, wherein the first tip portion is mated to the second tip portion, wherein the first tip portion is sandwiched between the second tip portion and the division member, wherein the recess is formed on the second strip, and wherein the door panel portion secures the second strip which in turn secures the first strip against the division member.

8. The assembly as defined in claim 7 wherein the protruding portion is coupled to the division member.

* * * * *